(12) United States Patent
Fujimaki

(10) Patent No.: US 12,375,627 B2
(45) Date of Patent: Jul. 29, 2025

(54) INFORMATION PROCESSING SYSTEM, DISPLAY DEVICE, AND PROGRAM

(71) Applicant: SEIKO EPSON CORPORATION, Tokyo (JP)

(72) Inventor: Yutaka Fujimaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 107 days.

(21) Appl. No.: 18/173,067

(22) Filed: Feb. 23, 2023

(65) Prior Publication Data

US 2023/0319237 A1   Oct. 5, 2023

(30) Foreign Application Priority Data

Feb. 25, 2022 (JP) .................. 2022-027686

(51) Int. Cl.
*H04N 7/18* (2006.01)
*G06T 19/00* (2011.01)
*H04N 23/69* (2023.01)

(52) U.S. Cl.
CPC ........... *H04N 7/181* (2013.01); *G06T 19/006* (2013.01); *H04N 23/69* (2023.01)

(58) Field of Classification Search
CPC ........ H04N 7/181; H04N 23/69; H04N 23/60; H04N 23/90
USPC .......................................... 348/158; 345/633
See application file for complete search history.

(56) References Cited

U.S. PATENT DOCUMENTS

| | | | | |
|---|---|---|---|---|
| 10,506,217 | B2* | 12/2019 | Linde | G03B 37/04 |
| 11,526,004 | B2* | 12/2022 | Koo | G06T 7/521 |
| 2008/0043113 | A1* | 2/2008 | Ishii | H04N 7/181 |
| | | | | 348/E7.086 |
| 2011/0221656 | A1* | 9/2011 | Haddick | H04N 5/44 |
| | | | | 345/156 |
| 2012/0293548 | A1* | 11/2012 | Perez | G06F 3/012 |
| | | | | 345/633 |
| 2013/0088413 | A1* | 4/2013 | Raffle | G09G 3/003 |
| | | | | 359/630 |
| 2014/0085203 | A1 | 3/2014 | Kobayashi | |
| 2014/0160129 | A1* | 6/2014 | Sako | G06F 3/011 |
| | | | | 345/427 |
| 2021/0026145 | A1* | 1/2021 | Fujimaki | H04N 13/383 |
| 2021/0142766 | A1* | 5/2021 | Sato | G10L 15/22 |

FOREIGN PATENT DOCUMENTS

JP    2014066927    4/2014

* cited by examiner

*Primary Examiner* — John W Miller
*Assistant Examiner* — Omer Khalid
(74) *Attorney, Agent, or Firm* — JCIPRNET

(57) ABSTRACT

An information processing system includes an HMD and a management server. The HMD includes a display unit of a transmissive type worn on a head of a user and a detection unit that detects motion of an eye of the user. The management server includes an identification unit that identifies a target object in a real space at which the user gazes through the display unit, based on the motion of the eye of the user, and an imaging control unit that causes a first imaging device of imaging devices to capture an image of a first imaging range including a first part of the target object, the first imaging device being at a position from which an image of the first part is capturable. The HMD causes the display unit to display a first captured image captured by the first imaging device.

8 Claims, 10 Drawing Sheets

INFORMATION PROCESSING SYSTEM, DISPLAY DEVICE, AND PROGRAM

The present application is based on, and claims priority from JP Application Serial Number 2022-027686, filed Feb. 25, 2022, the disclosure of which is hereby incorporated by reference herein in its entirety.

BACKGROUND

1. Technical Field

The present disclosure relates to an information processing system, a display device, and a program.

2. Related Art

Hitherto, there has been known a technique of displaying a captured image of a camera on a display device. JP-A-2014-66927 discloses a system in which a head-mounted display device of a transmissive type displays an image that is captured by a camera at a position away from a user. In the system, a captured image is selected from captured images captured by a plurality of cameras, based on motion of a head of a user, and is displayed by the head-mounted display device.

With the configuration disclosed in JP-A-2014-66927, an image is selected based on motion of a head of a user. Thus, when an image relating to an object at which the user gazes is to be displayed, the user is required to move their head in a gazing direction. Therefore, improvement in operability has been required.

SUMMARY

According to an aspect of the present disclosure, an information processing system includes a display device including a display unit of a transmissive type worn on a head of a user and a detection unit configured to detect motion of an eye of the user, and an information processing device including an identification unit configured to identify, based on the motion of the eye of the user, a target object in a real space at which the user gazes through the display unit and an imaging control unit configured to cause a first imaging device of imaging devices to capture an image of a first imaging range including a first part of the target object, the first imaging device being at a position from which an image of the first part is capturable, wherein the display device causes the display unit to display a first captured image captured by the first imaging device.

According to another aspect of the present disclosure, a display device includes a display unit of a transmission type worn on a head of a user, a detection unit configured to detect motion of an eye of the user, and a display control unit configured to display a first captured image on the display unit when a target object in a real space at which the user gazes through the display unit is identified based on the motion of the eye of the user detected by the detection unit and the first captured image obtained by capturing a first imaging range including a first part of the target object is acquired.

According to further another aspect of the present disclosure, a non-transitory computer-readable storage medium stores a program executable by a computer and configured to control a display device including a display unit of a transmissive type worn on a head of a user, the program being configured to cause the computer to function as a display control unit configured to display a first captured image on the display unit when a target object in a real space at which the user gazes through the display unit is identified based on motion of an eye of the user and the first captured image obtained by capturing a first imaging range including a first part of the target object is acquired.

DESCRIPTION OF EXEMPLARY EMBODIMENTS

Figure 1:
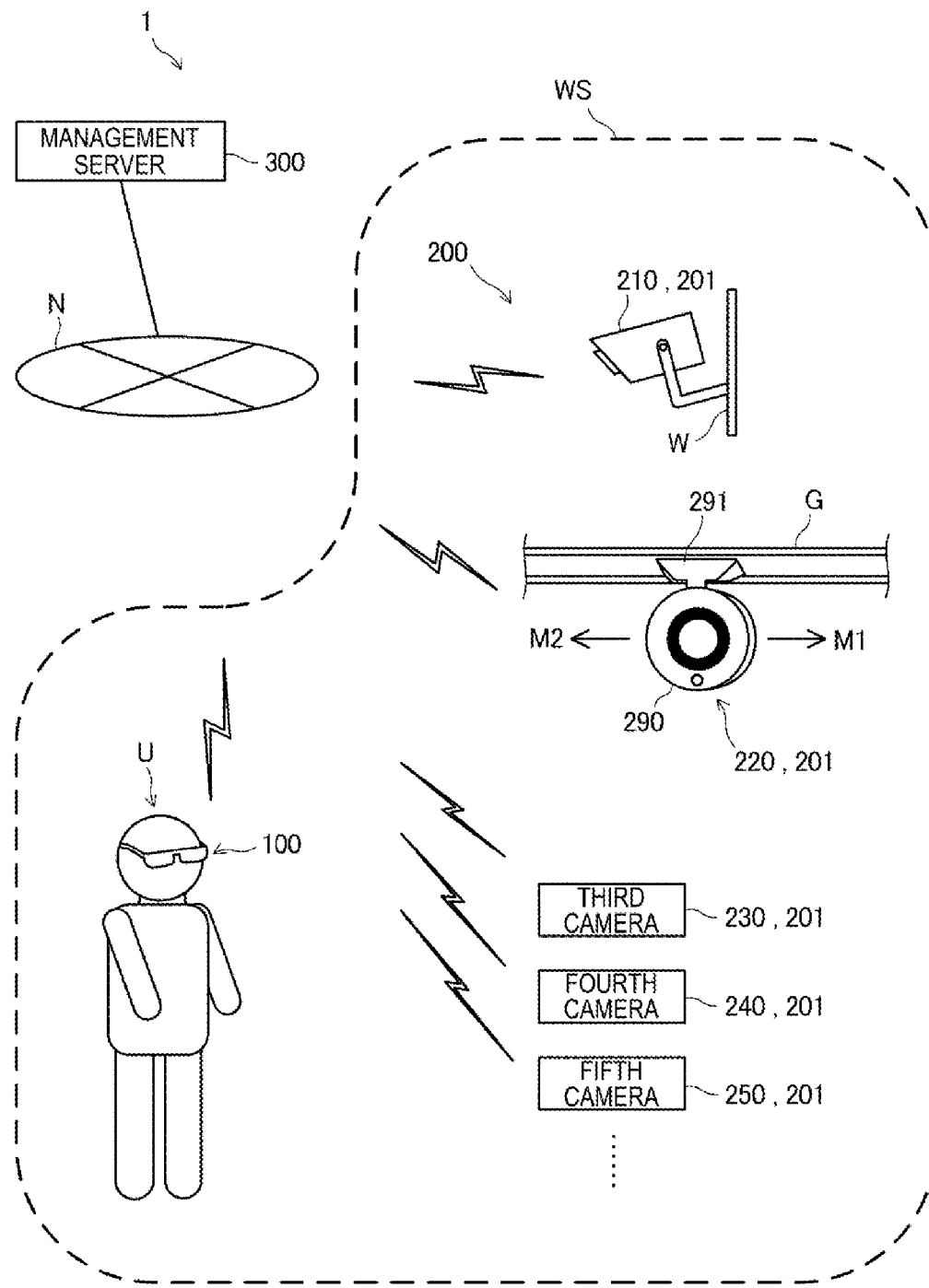
FIG. 1 is a diagram illustrating a configuration of an information processing system according to a first exemplary embodiment.

1. First Exemplary Embodiment 1-1. Configuration of Information Processing System FIG. 1 is a diagram illustrating a configuration of an information processing system 1 according to a first exemplary embodiment.

The information processing system 1 provides an image to an HMD 100 used by a user U. The HMD 100 is a head-mounted display device that the user U wears on their head. The user U wears the HMD 100, and thus can view an image without using their both hands. HMD is an abbreviation for Head Mounted Display.

The HMD 100 includes a communication device 141, which is described later with reference to FIG. 4, and is coupled to a communication network N via the communication device 141.

The communication network N may be Local Area Network (LAN) or Wide Area Network (WAN). Further, a global network configured to include a private line, a public line network, the Internet, and the like may be adopted. The communication network N may include devices such as a wireless base station, a server, a gateway, a wireless access point, and a router.

The information processing system 1 includes an imaging unit 200. The imaging unit 200 includes one or a plurality of imaging devices 201. The number of imaging devices 201 included in the imaging unit 200 is not limited. In the present exemplary embodiment, there is exemplified a configuration in which the imaging unit 200 at least includes a first camera 210, a second camera 220, a third camera 230, a fourth camera 240, and a fifth camera 250, as the imaging devices 201. In the following description, when the first camera 210, the second camera 220, the third camera 230, the fourth camera 240, the fifth camera 250, and other imaging devices are not distinguished from one another, the devices are described as the imaging devices 201.

Each of the imaging devices 201 is coupled to the communication network N. Any one of the imaging devices 201 including the first camera 210, the second camera 220, the third camera 230, the fourth camera 240, and the fifth camera 250 corresponds to an example of a first imaging device, and another one thereof corresponds to an example of a second imaging device. An image captured by the first imaging device corresponds to a first captured image, and an image captured by the second imaging device corresponds to a second captured image.

The information processing system 1 includes a management server 300. The management server 300 is coupled to the communication network N, and executes communication with the imaging devices 201 and the HMD 100 via the communication network N. The management server 300 acquires a captured image obtained by the imaging device 201, and transmits the captured image to the HMD 100. The management server 300 corresponds to an example of an information processing device.

The imaging devices 201 is only required to have a function of capturing an image. Positions at which the imaging devices 201 are installed and an installation method therefor are not limited, and the respective imaging devices 201 may be installed away from one another.

In the present exemplary embodiment, description is made on an example in which the imaging devices 201 are arranged so as to capture an image of a specific area WS. The area WS is a region obtained through geographical division. The user U wears the HMD 100, and performs monitoring, observation, management, and the like for work in the area WS. For example, the area WS is a work area, a ground, a court, or field in which a sport match takes place, an event venue in which a public or entertaining event takes place, a park, recreational facilities, an area set in a city area, or the like. The area WS may be outdoor or indoor. Examples of the work area may include a construction site including a building site, a harbor in which cargo handling work takes place, a warehouse in which cargo handling work takes place, a parking lot, a farm, a manufacturing factory, and a repair or maintenance factory, and places for other kinds of work may be included.

The first camera 210, the second camera 220, the third camera 230, the fourth camera 240, and the fifth camera 250 may be configured to capture an image of a fixed angle of view. However, operation conditions thereof may be adjustable. Adjustment of the operation conditions include adjustment of an angle of view or adjustment of imaging conditions. Adjustment of an angle of view indicates, for example, moving an angle of view in at least any one of directions including panning, tilting, and rolling. Further, adjustment of the imaging conditions indicates at least any one of change of zoom power and focus adjustment.

FIG. 1 illustrates, as an example, the first camera 210 installed on a wall surface W and the second camera 220 movable along a guide rail G. The first camera 210 is a camera fixed on the wall surface W, and is capable of adjusting an angle of view and adjusting a focus, for example. The wall surface W is not limited to a wall of a building, and may be a wall surface of a heavy machine or a vehicle. Focus adjustment is an example of adjustment of a focal distance.

The guide rail G is a rail that is fixed and laid on a side surface, a ceiling surface, or an upper surface of a building, a heavy machine, a vehicle, or the like. The guide rail G may be linear or may have a curved part. The second camera 220 includes a main body 290 that is meshed with the guide rail G. The main body 290 includes a traveling device including a motor and a roller. The second camera 220 operates the traveling device, and thus is capable of moving in moving directions M1 and M2 along the guide rail G. For example, when a moving direction and a moving amount are instructed, the second camera 220 is capable of traveling along the guide rail G under the instructions. The second camera 220 is capable of adjusting an angle of view.

Specific configurations of the third camera 230, the fourth camera 240, the fifth camera 250, and the other imaging devices 201 are freely selective. For example, those devices may each have a configuration fixed on a wall surface similarly to the first camera 210, or may each have a configuration capable of moving along a fixed guide rail similarly to the second camera 220.

The imaging unit 200 may include the imaging device 201 that is installed at a position from which an image of an entirety of the area WS is capturable. In other words, any one of the imaging devices 201 may be capable of capturing an image of most parts of the area WS.

Furthermore, the third camera 230, the fourth camera 240, and the fifth camera 250 may each have a configuration capable of moving in many directions in an autonomous manner. Specifically, a flying object including a propeller or the like may be adopted, or a traveling body including a tire and a steering mechanism may be adopted. Those devices may be so-called drones. Further, the devices may perform autonomous flying and traveling. However, there is no risk that a camera that is fixed similarly to the first camera 210 and a camera that moves along a fixed rail similarly to the second camera 220 do not excessively approach a human or an operation vehicle. Thus, in a location crowded with people or an operation location for machinery, a configuration similar to the first camera 210 or the second camera 220 is suitable.

The HMD 100 is a display device of a transmissive type through which external light passes. Thus, while wearing the HMD 100, the user U can visually recognize an outside scene through the HMD 100. In other words, the user U can visually recognize a real space in a direct manner with their own eyes. This visual recognition state is referred to as a direct view. The real space indicates an actual three-dimensional space.

In the information processing system 1, a captured image of the imaging unit 200 is transmitted to the HMD 100, and thus the user U is caused to visually recognize the captured image of the imaging unit 200. The management server 300 transmits, to the HMD 100, a captured image obtained by capturing a target object, which is present in a gazing direction of the user U, by the imaging unit 200.

Each of the imaging devices 201 can be installed at a position away from the HMD 100. The imaging device 201 is configured as a separate body from the HMD 100. The user U may approach the position at which the imaging device 201 is installed. When the user U is away from the imaging device 201, the imaging device 201 captures an image of a target object from a different position and/or a different direction from the user U. Therefore, when the user U can directly view a target object, the user U can view, through the HMD 100, a captured image obtained by capturing the target object from a different position or a different direction from the user U.

1-2. Configuration of HMD

Figure 2:
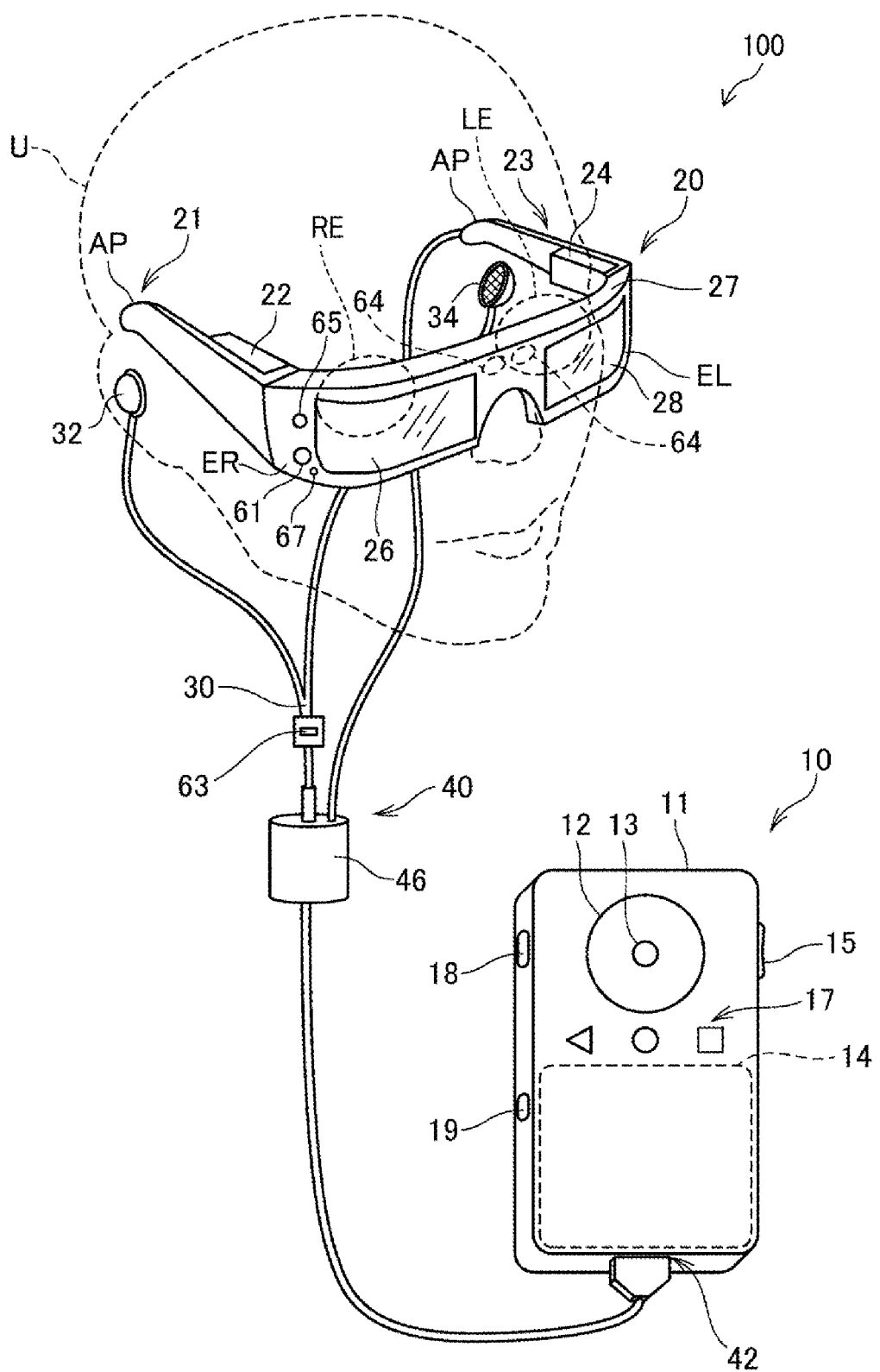
FIG. 2 is an external diagram of an HMD.
Figure 3:
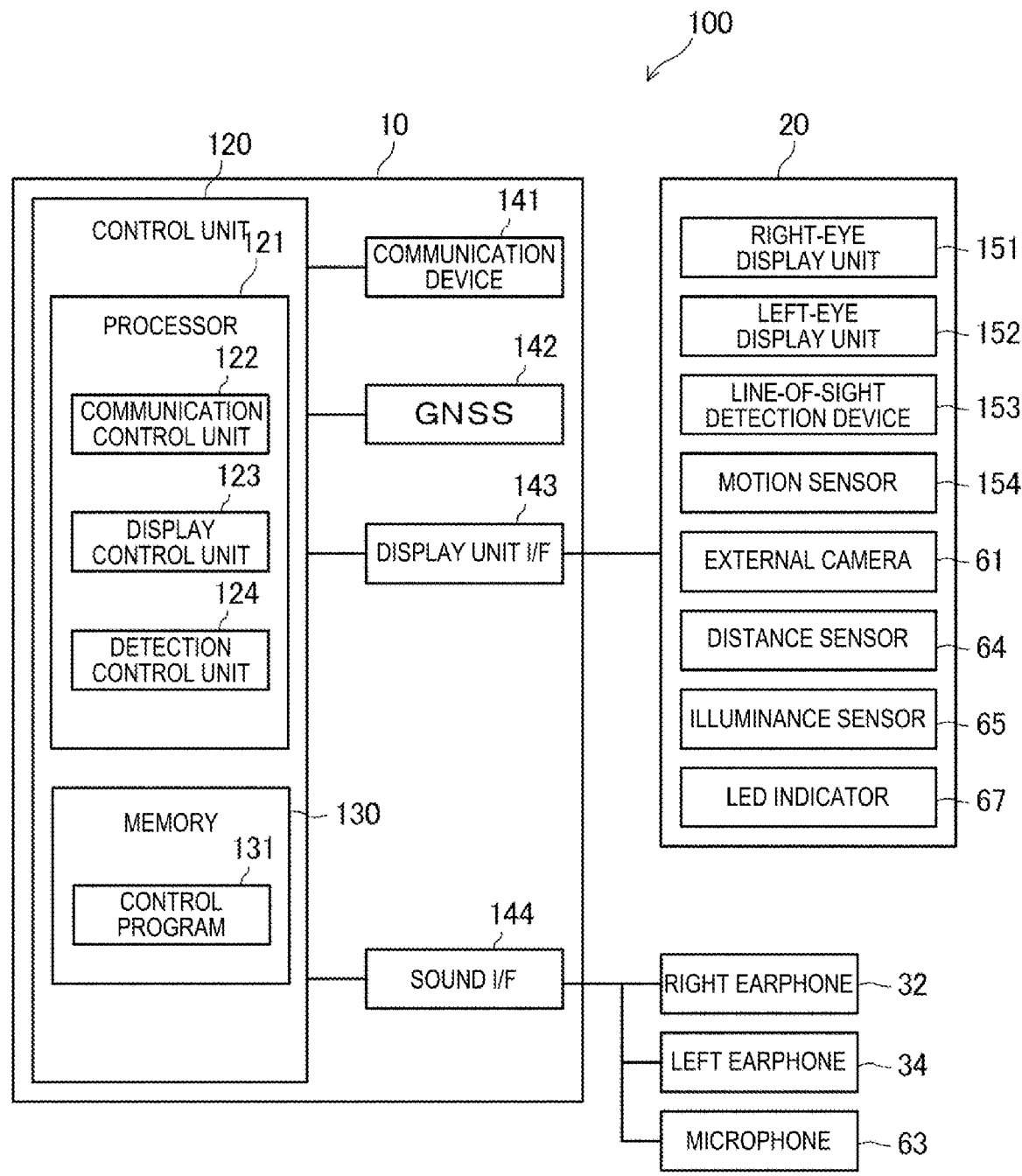
FIG. 3 is a block diagram of the HMD.

FIG. 2 is an external diagram of the HDM 100, and FIG. 3 is a block diagram of the HDM 100. With reference to these drawings, the configuration of the HMD 100 is described.

The HMD 100 includes a display unit 20 to be worn on the head of the user U, and a controller 10 that is coupled to the display unit 20. The controller 10 may be configured integrally with the display unit 20. The controller 10 functions as a control device that enables the user U to operate the HMD 100.

The display unit 20 causes the user U to visually recognize a virtual image while being worn on the head of the user. The display unit 20 is a display device of an optically transmissive type that allows a user to visually recognize a virtual image and, at the same time, visually recognize an outside scene in a direct manner. The outside scene is an external view with respect to the user U wearing the HMD 100, and refers to a scene of the real space visually recognizable with the naked eye even when the user U is not wearing the display unit 20. The user U may be regarded as an operator of the HMD 100. In the following description, a virtual image of the display unit 20, which is visually recognized by the user U, is referred to as a "display image" for convenience. Emitting image light based on image data from the display unit 20 of the HMD 100 is referred to as "displaying an image". Images are not limited to still images, and also include moving images or videos.

The controller 10 includes a box-shaped main body 11. The main body 11 includes various switches and the like as an operating element for receiving operations from the user U. In the present exemplary embodiment, the display unit 20 has an eyeglass-like shape. The display unit 20 includes a main body including a right holding part 21, a left holding part 23, and a front frame 27. The main body of the display unit 20 includes a right display unit 22, a left display unit 24, a right light-guiding plate 26, and a left light-guiding plate 28.

The right holding part 21 and the left holding part 23 extend rearward from the corresponding two ends of the front frame 27 to hold the display unit 20 on the head of the user U. One of the two ends of the front frame 27, which is positioned on the right side of the user U at the time of wearing the display unit 20, is referred to as an end ER, and the other one of the two ends, which is positioned on the left side, is referred to as an end EL.

The right light-guiding plate 26 and the left light-guiding plate 28 are provided at the front frame 27. While the display unit 20 is worn, the right light-guiding plate 26 is positioned in front of a right eye RE of the user U. The left light-guiding plate 28 is positioned in front of a left eye LE of the user U.

Each of the right display unit 22 and the left display unit 24 is a module obtained by unitizing an optical unit and a peripheral circuit. The right display unit 22 is attached to the right holding part 21 and the left display unit 24 is attached to the left holding part 23. The right display unit 22 and the left display unit 24 each include an organic Electro Luminescence (EL) display device or a liquid crystal display device, and emit image light based on image data.

The right light-guiding plate 26 and the left light-guiding plate 28 are optical components made of a light transmissive resin or the like. The right light-guiding plate 26 and the left light-guiding plate 28 are prisms, for example. The right light-guiding plate 26 guides image light output from the right display unit 22 to the right eye RE of the user U. The left light-guiding plate 28 guides image light output from the left display unit 24 to the left eye LE of the user. Therefore, the image light enters both the eyes of the user U, and thus the user U can visually recognize an image.

Imaging light guided by the right light-guiding plate 26 and external light passing through the right light-guiding plate 26 enter the right eye RE of the user U. Imaging light guided by the left light-guiding plate 28 and external light passing through the left light-guiding plate 28 enter the left eye LE of the user U. In this way, the HMD 100 superimposes the image light corresponding to the internally processed image on the external light, and causes the superimposed light to enter the eyes of the user U. This allows the user U to see an outside scene through the right light-guiding plate 26 and the left light-guiding plate 28. Furthermore, the user U can view the image from the image light superimposed on the outside scene.

An illuminance sensor 65 is arranged on the front frame 27. The illuminance sensor 65 receives external light from the front side of the user U wearing the display unit 20. An outer camera 61 includes an imaging element, such as a Charge Coupled Device (CCD) or a Complementary Metal-Oxide-Semiconductor (CMOS), and the like. The outer camera 61 is a digital camera that captures an image of an imaging range including the front side of the user U. The outer camera 61 may be a monocular camera, and may be a stereo camera.

A Light Emitting Diode (LED) indicator 67 is arranged on the front frame 27. The LED indicator 67 is arranged adjacent to the outer camera 61 at the end ER, and is lit up while the outer camera 61 is operating to give a notification that the imaging is in progress.

A distance sensor 64 is provided at the front frame 27. The distance sensor 64 detects a distance from the display unit 20 to a measurement target object positioned in front of the user U. The measurement target object is a real object or a structure in a real space. For example, the distance sensor 64 is a distance scanner of a light reflection type, a distance sensor of an ultrasonic wave type, or a laser range scanner.

The controller 10 and the display unit 20 are coupled by a coupling cable 40. The coupling cable 40 is detachably coupled to a connector 42 of the main body 11.

The coupling cable 40 includes an audio connector 46. The audio connector 46 is coupled to a headset 30. The headset 30 includes a right earphone 32 and a left earphone 34 constituting a stereo headphone, and a microphone 63.

The right earphone 32 is mounted on the right ear of the user U. The left earphone 34 is mounted on the left ear of the user U. The right earphone 32 and the left earphone 34 are in-ear-type earphones, or canal-type earphones. The right earphone 32 and the left earphone 34 may be an overhead-type headphone that contacts the pinnas via the earmuffs. The right earphone 32 and the left earphone 34 output sound based on a sound signal output from a sound interface 181, which is described later.

A microphone 63 collects sound, and outputs a sound signal to the sound interface 181. The microphone 63 may be a monaural microphone or a stereo microphone. The microphone 63 may be, for example, a directional microphone or a non-directional microphone.

The controller 10 includes a wheel operation unit 12, a central key 13, an operation pad 14, an up/down key 15, an LED display unit 17, and a power switch 18. These can also be referred to as operated units that are operated by the user U. These operated units are arranged on a surface of the main body 11. These operated units are operated with a finger of the user U, for example.

The LED display unit 17 is installed on the main body 11. The LED display unit 17 is an LED indicator indicating an operating state of the HMD 100. The LED display unit 17 is covered with a transmission part through which light can pass. The cover of the LED display unit 17 constitutes a portion of the surface of the main body 11. When the LED display unit 17 emits light, the light is passing through the transmission part. With this, letters, symbols, patterns, and the like formed at the transmission part can be visually recognized. A touch sensor that detects contact of the fingers of the user U is arranged on the LED display unit 17 over the transmission part. The LED display unit 17 and the touch sensor are combined to function as software keys.

The power switch 18 is a switch to turn on or off the power of the HMD 100. The main body 11 includes a USB connector 19 as an interface for coupling the controller 10 to external devices. USB is an abbreviation for Universal Serial Bus.

FIG. 3 is a block diagram illustrating a configuration of components configuring the HMD 100.

The HMD 100 includes a control unit 120, the communication device 141, a GNSS 142, a display unit interface 143, and a sound interface 144. For example, those given above are accommodated in the main body 11 of the controller 10.

The communication device 141 is a device including a transmitter and a receiver that are coupled to the communication network N. The communication device 141 executes communication with the management server 300 via the communication network N. For example, the communication device 141 executes wireless communication by a cellular communication method such as 3G communication, 4G communication, Long Term Evolution (LTE) communication, and 5G communication. The communication device 141 may be a communication device that executes near field wireless communication. For example, the communication device 141 may have a configuration that executes wireless communication in conformity with standards such as Bluetooth and a wireless LAN including Wi-Fi. Bluetooth is a trade name. Wi-Fi is a trade name.

The Global Navigation Satellite System (GNSS) 142 is a device that detects a current position of the HMD 100. For example, the GNSS 142 includes a GNSS receiver that receives positioning signals transmitted from a plurality of positioning satellites.

The display unit interface 143 includes, for example, the connector 42, and couples the controller 10 and the display unit 20 to each other via the coupling cable 40.

The sound interface 144 includes, for example, the audio connector 46, and couples the right earphone 32, the left earphone 34, and the microphone 63 to the controller 10.

The control unit 120 includes a processor 121 and a memory 130. The processor 121 is configured by a Central Processing Unit (CPU), a Micro-processing unit (MPU), or other integrated circuits. The processor 121 executes a program, and thus controls each component of the HMD 100.

The memory 130 is a storage device that stores a program executed by the processor 121 and data in a non-volatile manner. The memory 130 is configured by a magnetic storage device, a semiconductor storage element such as a flash Read Only Memory (ROM), or other types of non-volatile storage device. The memory 130 may include a Random Access Memory (RAM) configuring a work area of the processor 121. The memory 130 stores data to be processed by the processor 121 and a control program 131 to be executed by processor 121.

The display unit 20 includes a right-eye display unit 151, a left-eye display unit 152, a line-of-sight detection device 153, and a motion sensor 154. Further, as described above, the display unit 20 includes the outer camera 61, the distance sensor 64, the illuminance sensor 65, and the LED indicator 67.

The right-eye display unit 151 is a display unit that displays an image for the right eye RE of the user U. Specifically, the right-eye display unit 151 includes the right display unit 22 and the right light-guiding plate 26. The right-eye display unit 151 may include other peripheral circuits or optical components. The left-eye display unit 152 is a display unit that displays an image for the left eye LE of the user U. Specifically, the left-eye display unit 152 includes the left display unit 24 and the left light-guiding plate 28. The left-eye display unit 152 may include other peripheral circuits or optical components.

The line-of-sight detection device 153 detects motion of the eye of the user U. The line-of-sight detection device 153 detects motion of the eye, and thus identifies a line-of-sight direction. The line-of-sight detection device 153 includes a sensor or a camera for detecting motion of the eye. The line-of-sight detection device 153 corresponds to an example of a detection unit.

Specifically, the line-of-sight detection device 153 includes a camera that captures an image of at least one of the right eye RE and the left eye LE of the user U. For example, the camera is arranged on the front frame 27 in a direction oriented to the face of the user while the user wears the display unit 20, and captures an image of the eye of the user U. For example, the display unit 20 includes a pair of right and left cameras. The pair of cameras capture an image of the right eye RE of the user U and an image the left eye LE of the user U, respectively.

There may be adopted a configuration in which the line-of-sight detection device 153 includes one camera that captures an image of any one of the right eye RE and the left eye LE of the user U. Further, a position at which the camera is installed as the line-of-sight detection device 153 is not limited. For example, in the display unit 20, there may adopted a configuration in which the right eye RE or the left eye LE is captured as an image from the outside of the right light-guiding plate 26 or the left light-guiding plate 28. Further, the line-of-sight detection device 153 may have a configuration other than a camera for detecting motion of the eye of the user U.

The motion sensor 154 detects motion of the display unit 20. The motion sensor 154 may be referred to as a motion sensor or an inertial sensor. For example, the motion sensor 154 includes at least any one of a three-axis acceleration sensor, a three-axis gyro sensor, and a magnetic sensor. The motion sensor 154 may be an Inertial Measurement Unit (IMU) including a plurality of sensors that are formed into a module.

The processor 121 reads out and executes the control program 131 stored in the memory 130, and thus functions as a communication control unit 122, a display control unit 123, and a detection control unit 124.

The communication control unit 122 controls the communication device 141 to transmit and receive data or various signals with the management server 300.

The display control unit 123 controls the right-eye display unit 151 and the left-eye display unit 152 to display an image, based on data received by the communication device 141 from the management server 300. When data designating a display mode of an image is received from the management server 300, the display control unit 123 performs display in accordance with the data.

The detection control unit 124 acquires the detection values of the line-of-sight detection device 153, the motion sensor 154, the outer camera 61, the distance sensor 64, and the illuminance sensor 65. At least a part of the detection values acquired by the detection control unit 124 or data that is generated by the detection control unit 124 based on at least a part of the acquired detection values is transmitted by the communication control unit 122 to the management server 300.

The detection control unit 124 calculates a line-of-sight direction of at least any one of the right eye RE and the left eye LE, based on the detection result of the line-of-sight detection device 153, and identifies a gazing point of the user U, based on the calculated line-of-sight direction. The gazing point of the user U is a position at which the user U gazes in the real space. The detection control unit 124 may identify a gazing point by obtaining a gazing distance in addition to the line-of-sight direction of the user U. The gazing distance is a distance to the position at which the user U gazes. For example, the position of the gazing point of the user U is indicated with a relative three-dimensional position with the position of the display unit 20 as a reference.

Further, the detection control unit 124 acquires position information indicating a current position of the HMD 100 that is detected by the GNSS 142.

The detection control unit 124 generates posture information indicating an orientation of the display unit 20, based on the detection values of the motion sensor 154. The posture information indicates an orientation of the head of the user U wearing the display unit 20.

The detection control unit 124 generates gazing point information containing information indicating a gazing point, position information, and posture information. The gazing point information is transmitted by the communication control unit 122 to the management server 300.

Further, the detection control unit 124 may execute Simultaneous Localization and Mapping (SLAM) processing through use of at least one of the outer camera 61 and the distance sensor 64. The detection control unit 124 generates an environment map of objects around the user U wearing the display unit 20, and identifies a self-position of the user U on the environment map. The distance sensor 64 is a sensor for the SLAM process, and specifically constitutes a Light Detection and Ranging (LiDAR) system. Alternatively, the detection control unit 124 may generate data for causing the management server 300 to execute the SLAM process. A result obtained by the SLAM processing executed by the detection control unit 124 or data for the SLAM processing that is generated by the detection control unit 124 may be transmitted by the communication control unit 122 to the management server 300.

1-3. Configuration of Imaging Device

Figure 4:
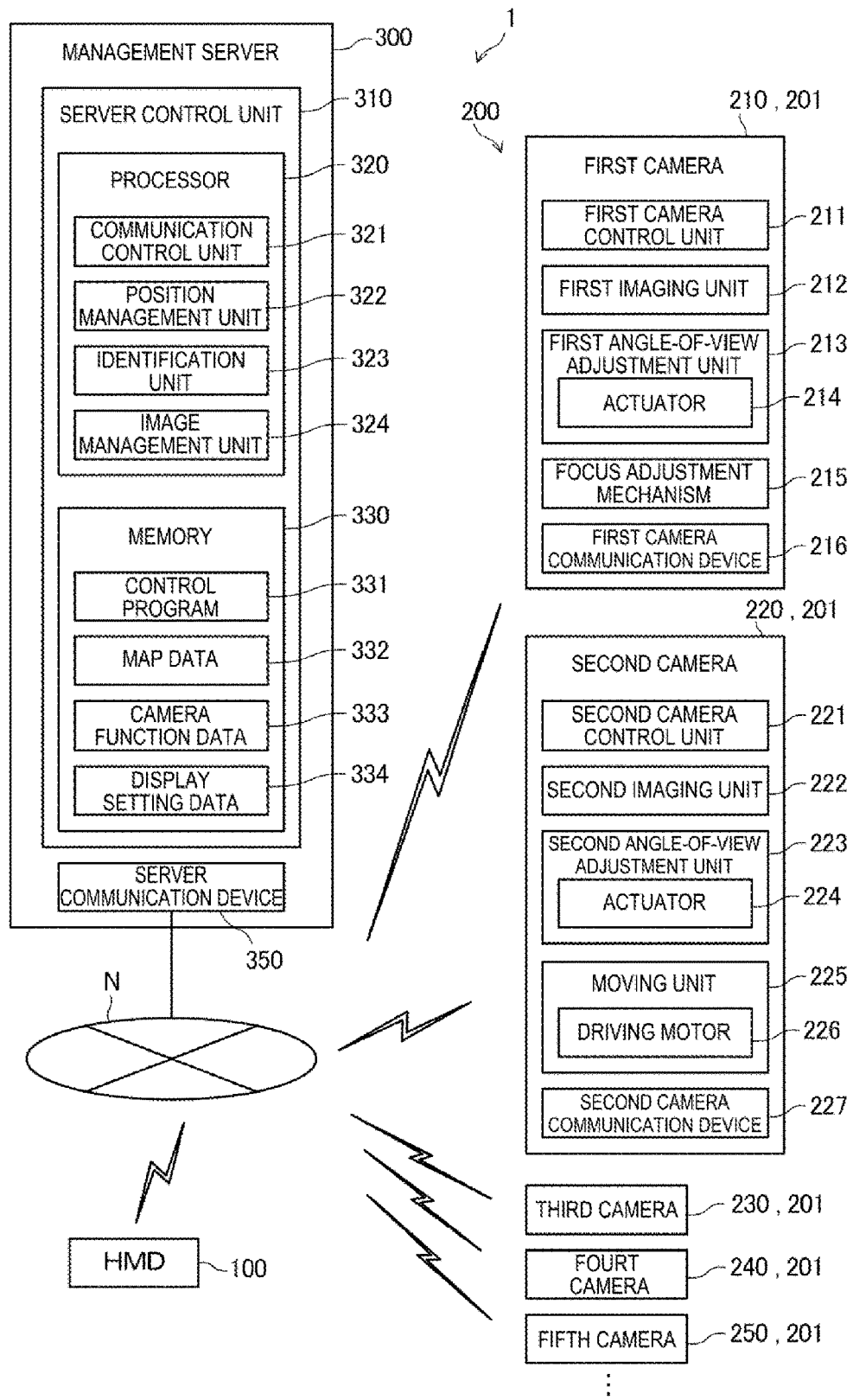
FIG. 4 is a block diagram of the information processing system.

FIG. 4 is a block diagram of the information processing system 1, and illustrates details of the configurations of the imaging unit 200 and the management server 300. First, the configuration of the imaging unit 200 is described.

As the configuration of the imaging devices 201, FIG. 4 illustrates a configuration including the first camera 210 and the second camera 220. The third camera 230, the fourth camera 240, the fifth camera 250, and the other imaging devices 201 may be configured similarly to the first camera 210 and the second camera 220.

The first camera 210 includes a first camera control unit 211, a first imaging unit 212, a first angle-of-view adjustment unit 213, the focus adjustment mechanism 215, and a first camera communication device 216.

The first camera control unit 211 includes a processor such as a micro-controller, an MPU, and a CPU, and controls each component of the first camera 210. The first camera control unit 211 may be a processor that executes a program or may be programmed hardware.

The first imaging unit 212 includes an imaging optical unit that includes an imaging element such as a CMOS or a CCD and an imaging lens, executes imaging under control of the first camera control unit 211, and outputs a captured image. The first imaging unit 212 may perform imaging with visible light, or may perform imaging with light outside the visible region. For example, the first imaging unit 212 may perform imaging with infrared light. The first imaging unit 212 may include a depth sensor. In this case, the first imaging unit 212 associates the captured image obtained by imaging with visible light and/or light outside the visible region and the depth data detected by the depth sensor with each other, and outputs the data.

The first angle-of-view adjustment unit 213 adjusts the imaging region that is captured as an image by the first imaging unit 212, that is, an angle of view. Specifically, the first angle-of-view adjustment unit 213 includes a driving unit that displaces an angle of view in at least any one of directions including panning, tilting, and rolling. Examples of the driving unit include an actuator or a motor. For example, the first angle-of-view adjustment unit 213 includes an actuator 214. The first angle-of-view adjustment unit 213 operates the actuator 214 under control of the first camera control unit 211, and thus turns or moves the imaging optical unit of the first imaging unit 212. The first angle-of-view adjustment unit 213 may be an image processing device that adjusts an angle of view by subjecting a captured image obtained by the first imaging unit 212 to subjecting image processing including trimming and rotation.

The focus adjustment mechanism 215 includes a driving unit, which is not illustrated, for operating the imaging optical unit included in the first imaging unit 212. Examples of the driving unit include an actuator or a motor. Under control of the first camera control unit 211, the focus adjustment mechanism 215 executes focus adjustment of the first imaging unit 212.

The first camera communication device 216 is a device including a transmitter and a receiver that are coupled to the communication network N. The first camera communication device 216 executes communication with the management server 300 via the communication network N. For example, the communication device 141 executes wireless communication by a cellular communication method such as 3G communication, 4G communication, LTE communication, and 5G communication. The first camera communication device 216 may be a communication device that executes near field wireless communication. For example, the first camera communication device 216 may have a configuration that executes wireless communication in conformity with standards such as Bluetooth and a wireless LAN including Wi-Fi.

The first camera control unit 211 controls the first imaging unit 212 to execute imaging, and generates image data or still image data based on a captured image output from the first imaging unit 212. The first imaging unit 212 controls the first camera communication device 216 to transmit the image data or the still image data to the management server 300. When the first imaging unit 212 includes the depth sensor, the first camera control unit 211 associates depth data with the image data or the still image data, and transmits the data to the management server 300.

The first camera control unit 211 controls the first angle-of-view adjustment unit 213 and the focus adjustment mechanism 215 to adjust an angle of view and focus of the first camera 210. The first camera control unit 211 causes the first camera communication device 216 to receive, from the management server 300, data for instructing adjustment of an angle of view and/or focus adjustment. The first camera control unit 211 controls the first angle-of-view adjustment unit 213 and the focus adjustment mechanism 215, based on the received data.

The second camera 220 includes a second camera control unit 221, a second imaging unit 222, a second angle-of-view adjustment unit 223, a moving unit 225, and a second camera communication device 227.

The second camera control unit 221 includes a processor such as a micro-controller, an MPU, and a CPU, and controls each component of the second camera 220. The second camera control unit 221 may be a processor that executes a program or may be programmed hardware.

The second imaging unit 222 includes an imaging optical unit that includes an imaging element such as a CMOS or a CCD and an imaging lens, executes imaging under control of the second camera control unit 221, and outputs a captured image. The second imaging unit 222 may perform imaging with visible light, or may perform imaging with light outside the visible region. For example, the second imaging unit 222 may perform imaging with infrared light. The second imaging unit 222 may include a depth sensor. In this case, the second imaging unit 222 associates the captured image obtained by imaging with visible light and/or light outside the visible region and the depth data detected by the depth sensor with each other, and outputs the data.

The second angle-of-view adjustment unit 223 adjusts the imaging region that is captured as an image by the second imaging unit 222, that is, an angle of view. Specifically, the second angle-of-view adjustment unit 223 includes a driving unit that displaces an angle of view in at least any one of directions including panning, tilting, and rolling. Examples of the driving unit include an actuator or a motor. For example, the second angle-of-view adjustment unit 223 includes an actuator 224. The second angle-of-view adjustment unit 223 operates the actuator 224 under control of the second camera control unit 221, and thus turns or moves the imaging optical unit of the second imaging unit 222. The second angle-of-view adjustment unit 223 may be an image processing device that adjusts an angle of view by subjecting a captured image obtained by the second imaging unit 222 to subjecting image processing including trimming and rotation.

The moving unit 225 includes a driving motor 226 accommodated in the main body 290 and a roller, which is not illustrated, driven by the driving motor 226. The roller of the moving unit 225 is meshed with the guide rail G. The moving unit 225 operates the driving motor 226 under control of the second camera control unit 221, and thus moves the second camera 220 along the guide rail G. Further, the moving unit 225 switches rotation directions of the driving motor 226, and thus switches a moving direction of the second camera 220 between the moving direction M1 and the moving direction M2.

The second camera communication device 227 is a device including a transmitter and a receiver that are coupled to the communication network N. The second camera communication device 227 executes communication with the management server 300 via the communication network N. For example, the communication device 141 executes wireless communication by a cellular communication method such as 3G communication, 4G communication, LTE communication, and 5G communication. The second camera communication device 227 may be a communication device that executes near field wireless communication. For example, the second camera communication device 227 may have a configuration that executes wireless communication in conformity with standards such as Bluetooth and a wireless LAN including Wi-Fi.

The second camera control unit 221 controls the second imaging unit 222 to execute imaging, and generates image data based on a captured image obtained by the second imaging unit 222. The second imaging unit 222 controls the second camera communication device 227 to transmit the image data to the management server 300.

The second camera control unit 221 controls the second imaging unit 222 to execute imaging, and generates image data or still image data based on a captured image output from the second imaging unit 222. The second imaging unit 222 controls the second camera communication device 227 to transmit the image data or the still image data to the management server 300. The second imaging unit 222 includes the depth sensor, the second camera control unit 221 associates depth data with the image data or the still image data, and transmits the data to the management server 300.

The second camera 220 may include a focus adjustment mechanism similar to the focus adjustment mechanism 215. In this case, the second camera control unit 221 controls the focus adjustment mechanism to execute focus adjustment of the second imaging unit 222.

The third camera 230, the fourth camera 240, the fifth camera 250, and the other imaging devices 201 are configured similarly to the first camera 210 and the second camera 220.

1-4. Configuration of Management Server

The management server 300 includes a server control unit 310 and a server communication device 350. The server control unit 310 includes a processor 320 and a memory 330.

The processor 320 is configured by a CPU, an MPU, or other integrated circuits. The processor 320 executes a program, and thus controls each component of the HMD 100.

The memory 330 is a storage device that stores a program executed by the processor 320 and data in a non-volatile manner. The memory 330 is configured by a magnetic storage device, a semiconductor storage element such as a flash ROM, or other types of non-volatile storage device. The memory 330 may include a RAM configuring a work area of the processor 320. The memory 330 stores data to be processed by the processor 320 and a control program 331 to be executed by the processor 320.

The server communication device 350 is a device including a transmitter and a receiver that are coupled to the communication network N. The server communication device 350 executes communication with the HMD 100 and the imaging devices 201 via the communication network N. For example, the server communication device 350 executes wireless communication by a cellular communication method such as 3G communication, 4G communication, LTE communication, and 5G communication. The server communication device 350 may be a communication device that executes near field wireless communication. For example, the server communication device 350 may have a configuration that executes wireless communication in conformity with standards such as Bluetooth and a wireless LAN including Wi-Fi. The server communication device 350 corresponds to an example of a communication unit.

The processor 320 reads out and executes the control program 331 stored in the memory 330, and thus functions as a communication control unit 321, a position management unit 322, an identification unit 323, and an image management unit 324.

The communication control unit 321 causes the server communication device 350 to transmit and receive various types of data and signals with the HMD 100. Further, the communication control unit 321 causes the server communication device 350 to transmit and receive various types of data and signals with the first camera 210, the second camera 220, the third camera 230, the fourth camera 240, and the fifth camera 250.

The position management unit 322 detects a position of an object in a region in which the imaging unit 200 is installed. For example, the position management unit 322 identifies positions of the first camera 210, the second camera 220, the third camera 230, the fourth camera 240, the fifth camera 250, and the other imaging devices 201 in the area WS. Those positions may be obtained in advance. The position management unit 322 generates map data 332 obtained by mapping the positions of the imaging devices 201 in the area WS in a three-dimensional manner, and causes the memory 330 to store the map data 332. The map data 332 may be generated by another device in advance, and may be stored in the memory 330.

The position management unit 322 analyzes an image or a still image captured by the imaging devices 201, and thus a position and a shape of an object positioned in the area WS. The position management unit 322 reflects the identified position and shape of the object in the map data 332. The position management unit 322 executes, for example, the SLAM processing so as to identify the position and the shape of the object in the area WS. For example, in the SLAM process, at least any one of the still image data, the image data, and the depth data that are received from the imaging devices 201 is used. Further, in addition to the imaging devices 201, the information processing system 1 may include a LiDAR system including a laser range scanner or the like. In this case, the position management unit 322 may identify the position and the shape of the object in the area WS through use of the LiDAR.

The position management unit 322 identifies a position of the user U, and reflects the identified position in the map data 332. The position management unit 322 may identify a direction of the display unit 20, and reflect the identified direction in the position management unit 322. For example, the position management unit 322 identifies the position of the user U and the orientation of the display unit 20 through use of the position information transmitted by the HMD 100. The position management unit 322 may identify the position of the user U and the orientation of the display unit 20 through use of a captured image obtained by the outer camera 61 of the HMD 100. Further, the position management unit 322 may identify the position of the user U and the orientation of the display unit 20 through use of the posture information that is generated by the HMD 100, based on the distance measured by the distance sensor 64 and/or the detection result of the motion sensor 154 of the HMD 100.

The map data 332 contains information for identifying positions and orientations of the imaging devices 201, the display unit 20, and the other objects at least in the area WS. For example, the map data 332 contains information indicating imaging directions and positions of the first camera 210, the second camera 220, the third camera 230, the fourth camera 240, and the fifth camera 250. Further, for example, the position management unit 322 contains information indicating the orientation and the position of the display unit 20. Further, for example, the position management unit 322 contains information indicating orientations, shapes, and positions of objects other than those of the imaging unit 200 and the user U. The information contained in the map data 332 is, for example, information in which a three-dimensional position of an object in the area WS is expressed as a coordinates in a commonly-shared coordinate system. Further, the information contains in the map data 332 further contains vector information indicating orientation of an object in the area WS.

The position management unit 322 executes identification of the position and the shape of the object in the area WS in a repeating manner for each predetermined time period, and updates the map data 332 based on the result. In this manner, the position management unit 322 is capable of following, that is, tracking a position of a specific object in the area WS.

The identification unit 323 identifies a target object at which the user U gazes, based on the map data 332. The identification unit 323 identifies a gazing point in the coordinate system indicated in the map data 332, based on the gazing point information transmitted by the HMD 100. The gazing point information contains the position information of the HMD 100, the posture information, and the information indicating the gazing point. From those pieces of information, the identification unit 323 calculates coordinates of the gazing point. Furthermore, the identification unit 323 identifies an object at a position overlapping with the gazing point as the target object at which the user U gazes. Further, the identification unit 323 may identify a position of the target object at which the user U gazes.

The identification unit 323 executes the processing of mapping the gazing point in the coordinate system of the map data 332 every time the gazing point information is received from the HMD 100. With this, the identification unit 323 is capable of tracking movement of the gazing point of the user U.

The image management unit 324 executes processing relating to imaging of the imaging unit 200 and displaying of the HMD 100. The image management unit 324 corresponds to an example of an imaging control unit and an image control unit. The image management unit 324 selects the imaging devices 201 suitable for capturing an image of the target object among the imaging devices 201 included in the imaging unit 200. For example, the image management unit 324 selects the imaging device 201 close to the target object.

The image management unit 324 causes the imaging device 201 to adjust an angle of view so that the angle of view of the selected imaging device 201 includes the target object. For example, the image management unit 324 transmits data for instructing a direction of moving an angle of view and an adjustment amount of moving an angle of view to at least one of the first camera 210, the second camera 220, the third camera 230, the fourth camera 240, and the fifth camera 250. For example, the adjustment amount is an angle of moving an angle of view or an operation amount of the driving unit. Further, the image management unit 324 may transmit data for instructing adjustment of gain, white balance, or the like of imaging data of each of the imaging devices 201.

With respect to the imaging device 201 having a focus adjustment function, the image management unit 324 calculates a distance between the target object and the imaging device 201, based on the map data 332, and transmits data for instructing focus adjustment in accordance with the calculated distance.

For each of the imaging devices 201, camera function data 333 stored in the memory 330 contains information indicating presence or absence of an angle-of-view adjustment function, presence or absence of a focus adjustment function, and contents of those functions. Referring to the camera function data 333, the image management unit 324 is capable of transmitting data that matches with the function of the imaging device 201 and executing adjustment as appropriate.

The image management unit 324 transmits an image that is captured by the selected imaging device 201, to the HMD 100. The image management unit 324 transmits data designating a display state of the HMD 100, to the HMD 100. For example, the image management unit 324 selects any one of direct-view display setting data and camera-image display setting data. In the direct-view display setting data, a display state suitable for a state in which the user U can directly view the target object is designated. In the camera-image display setting data, a display state suitable for a state in which the user U cannot directly view the target object is designated. For example, those pieces of the display setting data are stored as the display setting data 334 in the memory 330.

1-5. Operation of Information Processing System

Figure 5:
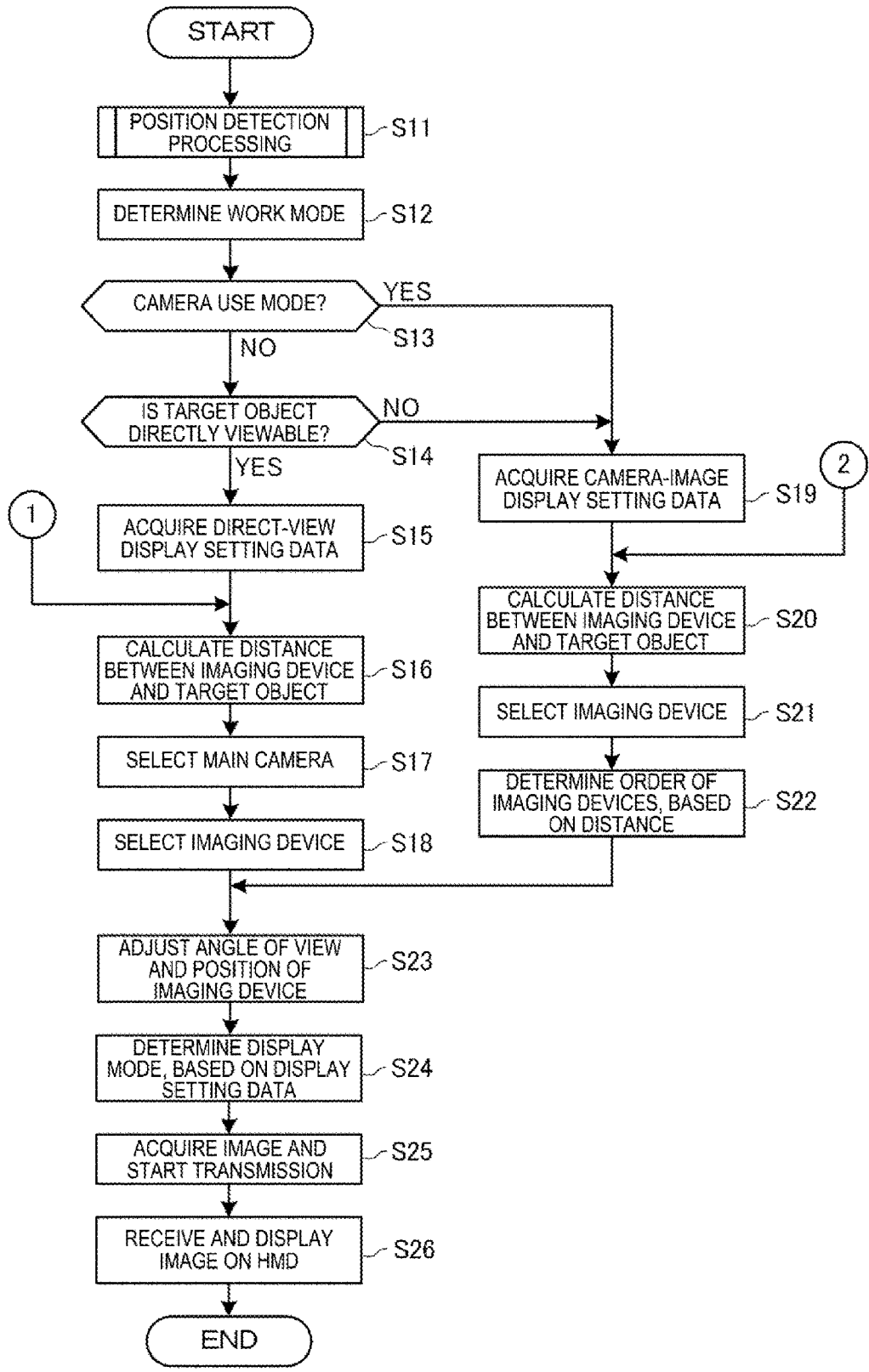
FIG. 5 is a flowchart illustrating an operation of the information processing system.
Figure 6:
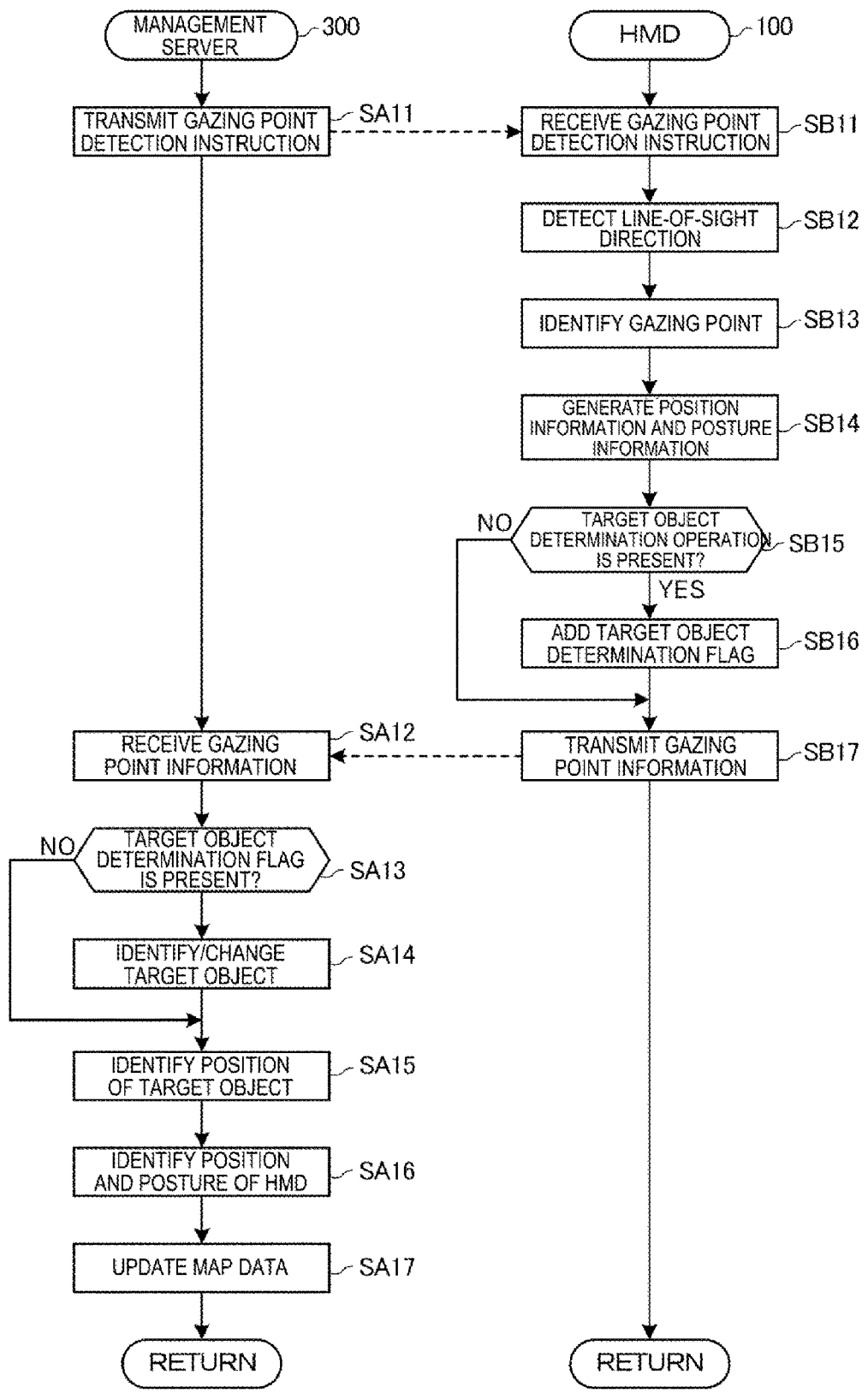
FIG. 6 is a sequence diagram illustrating an operation of the information processing system.
Figure 7:
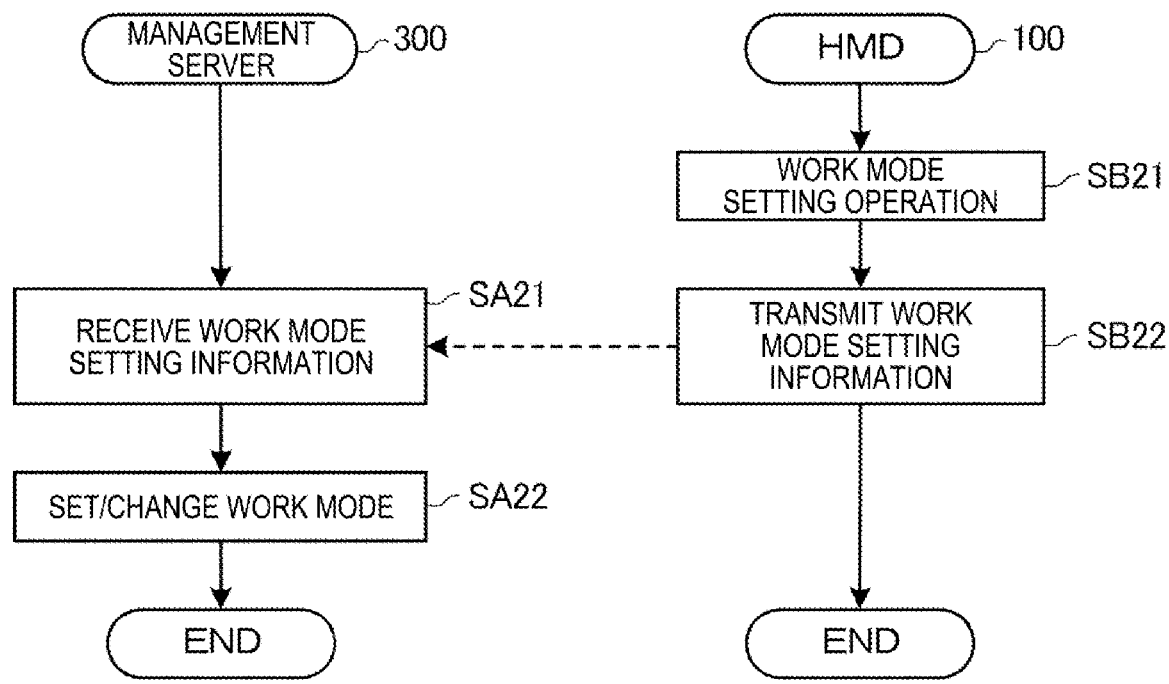
FIG. 7 is a sequence diagram illustrating an operation of the information processing system.

FIG. 5 is a flowchart illustrating an operation of the information processing system 1. Each of FIG. 6 and FIG. 7 is a sequence diagram illustrating the operations of the information processing system 1, and illustrates the operations of the HMD 100 and the management server 300. With reference to these drawings, the operations of the information processing system 1 are described below.

During the operation described below, the position management unit 322 detects the position and the orientation of the object in the area WS as described above, and executes the processing of updating the map data 332 for each predetermined time period. The processing is not illustrated in the flowchart.

The operations in FIG. 5 include the operations of the management server 300 and the HMD 100. Step S11 is executed by the management server 300 and the HMD 100. Step S12 to Step S21 and Step S23 to Step S24 are executed by the management server 300, and Step S22 is executed by the HMD 100.

In the operations in FIG. 5, in the information processing system 1, the HMD 100 and the management server 300 execute position detection processing (Step S11).

The position detection processing in Step S11 is illustrated in detail in FIG. 6.

The communication control unit 321 transmits a gazing point detection instruction to the HMD 100 (Step SA11). The gazing point detection instruction is data for instructing execution of detection of the gazing point.

The communication control unit 122 receives the gazing point detection instruction from the management server 300 (Step SB11). The detection control unit 124 detects the line-of-sight direction of the user U, based on the detection result of the line-of-sight detection device 153 or the like (Step SB12), and identifies the gazing point of the user U, based on the line-of-sight direction (Step SB13). The detection control unit 124 generates the position information and the posture information, based on the detection results of the GNSS 142 and the motion sensor 154 (Step SB14).

Here, the detection control unit 124 determines whether the user U performs an operation of determining the target object (Step SB15). The operation of determining the target object includes the following items (1) to (4).

(1) The user gazes at the target object in the real space for a predetermined time period or longer.

(2) The user performs determination motion while gazing at the target object in the real space.

(3) The user gazes at the target object in the image displayed by the HMD 100 for the predetermined time period or longer.

(4) The user performs determination motion while gazing at the target object in the image displayed by the HMD 100.

Here, the predetermined time period is a time period that is set in advance. The HMD 100 stores setting values for the predetermined time period in the memory 130. The determination motion is an operation that is set in advance as an operation of setting the target object, and a plurality of determination motions may be set. Types and contents of the determination motion are not limited. For example, the determination motion may be an operation with respect to the wheel operation unit 12, the central key 13, the operation pad 14, the power switch 18, or the like of the controller 10. Further, the determination motion may be an operation of moving the controller 10 or the display unit 20 in a predetermined operation pattern. Further, the determination motion may be an operation of applying vibration to the controller 10 or the display unit 20 in a predetermined vibration pattern. Further, the determination motion may be a gesture operation performed by moving the body of the user U in a predetermined operation pattern. The gesture operation may be motion that can be detected by the detection control unit 124 from a captured image of the outer camera 61.

When it is determined that the target object determination operation is performed (YES in Step SB15), the detection control unit 124 adds a target object determination flag to the information indicating the gazing point identified in Step SB13 (Step SB16), and proceeds to Step SB17. When it is determined that the target object determination operation is not performed (NO in Step SB15), the detection control unit 124 skips Step SB16, and proceeds to Step SB17.

In Step SB17, the detection control unit 124 generates the gazing point information containing the processing results in Step SB13 Step SB14, and causes the communication device 141 to transmit the information to the management server 300 (Step SB17). After that, the control unit 120 returns to the operations in FIG. 5.

The communication control unit 321 receives the gazing point information transmitted by the HMD 100 (Step SA12). The identification unit 323 determines whether the gazing point information contains the target object determination flag (Step SA13). When the gazing point information contains the target object determination flag (YES in Step SA13), the identification unit 323 identifies the target object, based on the gazing point information and the map data 332 (Step SA14). In Step SA14, in a state in which the target object is previously identified, the identification unit 323 changes the target object. After that, the server control unit 310 proceeds to Step SA15. Further, when the gazing point information does not contain the target object determination flag (NO in Step SA13), the server control unit 310 skips Step SA14, and proceeds to Step SA15.

In Step SA15, the position management unit 322 identifies the position of the target object, based on the gazing point information (Step SA15). In Step SA15, the position management unit 322 may refer to the map data 332. The position management unit 322 identifies the position and the posture of the display unit 20, based on the gazing point information (Step SA16). The position management unit 322 updates the map data 332, based on the processing result of Step SA16 (Step SA17). After that, the server control unit 310 returns to the operations in FIG. 5.

FIG. 6 illustrates an example in which the detection control unit 124 generates and transmits the gazing point information when the position management unit 322 transmits the gazing point detection instruction as a trigger. This is merely an example. For example, there may be adopted a configuration in which the detection control unit 124 generates the gazing point information for each predetermined time period during the operation of the information processing system 1 or in accordance with an input from the user U. In this case, the management server 300 is capable of receiving the gazing point information in a cycle of the predetermined time period.

As illustrate din FIG. 5, the image management unit 324 determines a work mode of the HMD 100 (Step S12). A plurality of work modes are set in advance for the HMD 100. A display state of the HMD 100 is changed for each work mode. In the present exemplary embodiment, as the work modes, two modes including a camera use mode and a mode in which direct view of the user U on the target object is prioritized are switched and executed. In the present exemplary embodiment, the camera use mode is referred to as a first mode, the mode in which direct view of the user U on the target object is prioritized is referred to as a second mode. Selection of the work mode is performed by operating the HMD 100.

The operations of the HMD 100 and the management server 300 at the time of setting and changing the work mode are illustrated in FIG. 7.

In FIG. 7, Step SA21 to Step SA22 illustrate the operations of the management server 300, Step SB21 to Step SB22 illustrate the operations of the HMD 100.

The detection control unit 124 detects that the user U performs an operation of setting the work mode (Step SB21). The operation of setting the work mode is an operation that is set in advance, and a plurality of operations may be set therefor. Types and contents of the operation is not limited. For example, the operation of setting the work mode may be an operation with respect to the wheel operation unit 12, the central key 13, the operation pad 14, the power switch 18, or the like of the controller 10. Further, the operation of setting the work mode may be an operation of moving the controller 10 or the display unit 20 in a predetermined operation pattern. Further, the operation of setting the work mode may be an operation of applying vibration to the controller 10 or the display unit 20 in a predetermined vibration pattern. Further, the operation of setting the work mode may be a gesture operation performed by moving the body of the user U in a predetermined operation pattern. The gesture operation may be motion that can be detected by the detection control unit 124 from a captured image of the outer camera 61.

The communication control unit 122 transmits work mode setting information to the management server 300 (Step SB22). The work mode setting information contains information indicating the work mode that is set by the user U in Step SB21.

The communication control unit 321 receives the work mode setting information transmitted by the HMD 100 (Step SA21). The image management unit 324 sets or changes the work mode of the HMD 100, based on the work mode setting information (Step SA22).

The operations of FIG. 7 are executed as required during the operations of the information processing system 1. For example, when the user U performs the operation of setting the work mode, this operation is regarded as a trigger, and the HMD 100 starts Step SB21 of FIG. 7 as interruption processing.

Returning to FIG. 5, in Step S12, the image management unit 324 determines the work mode that is set based on the operation of the HMD 100. The image management unit 324 determines whether the work mode is the first mode, that is, the camera use mode (Step S13).

When it is determined that the work mode is not the camera use mode (NO in Step S13), the image management unit 324 determines whether the user U can directly view the target object (Step S14). In Step S14, for example, the image management unit 324 determines whether an obstacle object that blocks a line of site is present between the position of the display unit 20 and the position of the target object, based on the map data 332. When the obstacle object is present, the image management unit 324 determines that the user U cannot directly view the target object. When the obstacle object is not present, it is determined that the user U can directly view the target object.

When it is determined that the user U can directly view the target object (YES in Step S14), the image management unit 324 acquires the direct-view display setting data from the display setting data 334 (Step S15). The image management unit 324 calculates a distance from each of the imaging devices 201 to the target object, based on the map data 332 (Step S16). The image management unit 324 selects a main camera from the plurality of imaging devices 201 (Step S17). For example, the image management unit 324 selects, as the main camera, the imaging device 201 with the shortest distance to the target object from the plurality of imaging devices 201. The image management unit 324 may select, as the main camera, the imaging device 201 capable of capturing an image of the target object near the center of the angle of view.

The image management unit 324 further selects a predetermined number of imaging devices 201 (Step S18). The number of imaging devices 201 that are selected by the image management unit 324 in Step S18 is the number that is determined in the display setting data acquired in Step S15. An image captured by the imaging device 201 selected in Step S18 is transmitted to the HMD 100, and is displayed on the HMD 100. For example, the image management unit 324 selects the predetermined number of imaging devices 201 in the order from the imaging device 201 with the smallest distance to the target object. Further, the image management unit 324 may select the imaging device 201 capable of capturing an image of the target object at a position near the center of the angle of view.

The image management unit 324 may select the imaging devices 201 in Step S18 so that the plurality of imaging devices 201 captures images of different parts of the target object. In other words, the image management unit 324 performs selection in Step S18 so that a combination of the main camera selected in Step S17 and the imaging devices 201 to be selected in Step S18 capture images of different parts of the target object. In a case in which the plurality of imaging devices 201 capture images of the target object, when the imaging devices 201 have different angles oriented to the target object, it can be understood that those imaging devices capture images of different parts of the target object. For example, in a case in which at least two imaging devices 201 are selected in Step S17 and Step S18, when the two imaging devices 201 have angles oriented to the target object that are inclined more than a set value, the condition described above is satisfied. According to this condition, when one imaging device 201 captures an image of a part of the target object that is regarded as a first part, the other imaging device 201 captures an image of a second part different from the first part. In other words, one imaging device 201 selected by the image management unit 324 is at a position from which an image of the first part of the target object is capturable, and the other imaging device 201 is at a position from which an image of the second part of the target object is capturable. When those images captured by the imaging devices 201 are displayed by the HMD 100, the user U can visually recognize the captured images obtained by capturing the two different parts of the target object. Therefore, the imaging devices 201 is used to effectively assist the user U to visually recognize the target object.

After that, the server control unit 310 proceeds to Step S23.

When it is determined that the work mode is the camera use mode (NO in Step S13), and it is determined that the user U cannot directly view the target object (NO in Step S14), the image management unit 324 proceeds to Step S19.

In Step S19, the image management unit 324 acquires the camera-use display setting data from the display setting data 334 (Step S19). The image management unit 324 calculates the distance from each of the imaging devices 201 to the target object, based on the map data 332 (Step S20). The image management unit 324 selects a predetermined number of imaging devices 201 (Step S21). The number of imaging devices 201 that are selected by the image management unit 324 in Step S21 is the number that is determined in the display setting data acquired in Step S19. Selection in Step S21 is executed similarly to Step S18. Subsequently, in Step S21, the image management unit 324 performs ordering with respect to the selected imaging devices 201, based on the distances to the target object (Step S22). Specifically, the image management unit 324 determines the order from the imaging device 201 with the shortest distance to the target object. After that, the server control unit 310 proceeds to Step S23.

In Step S23, the image management unit 324 causes the imaging devices 201 selected in Step S17, Step S18, and Step S21 to adjust an angle of view (Step S19). Specifically, the image management unit 324 transmits data designating a direction and an adjustment amount for changing an angle of view to the imaging devices 201. When the selected imaging device 201 has a movable configuration, the image management unit 324 transmits data designating a moving direction and a moving amount to the imaging device 201.

The image management unit 324 determines the display mode of the HMD 100, based on the display setting data acquired in Step S15 or Step S19 (Step S24). Specifically, the image management unit 324 determines an arrangement of the images and a display size of the images that are captured by the imaging devices 201 selected in Step S17, Step S18, and Step S21, in accordance with the display setting data.

The image management unit 324 starts acquisition of the images captured by the imaging devices 201 selected in Step S17, Step S18, and Step S21 (Step S25). Further, in Step S25, the image management unit 324 starts an operation of transmitting the acquired images to the HMD 100. Specifically, the image management unit 324 synthesizes display data for displaying the images obtained by the selected imaging devices 201 in the display mode determined in Step S24, and transmits the synthesized display data to the HMD 100.

In the HMD 100, the communication control unit 122 receives the image transmitted from the management server 300, and the display control unit 123 controls the display unit 20, based on the received image. With this, the image is displayed on the display unit 20 (Step S26).

In Step S25, the image management unit 324 may transmit, to the HMD 100, the images obtained by the imaging devices 201 and the data designating the image display mode. In this case, in Step S26, in the HMD 100, the plurality of images received from the management server 300 are arranged in accordance with the display mode determined by the image management unit 324, and are displayed on the display unit 20.

Figure 8:
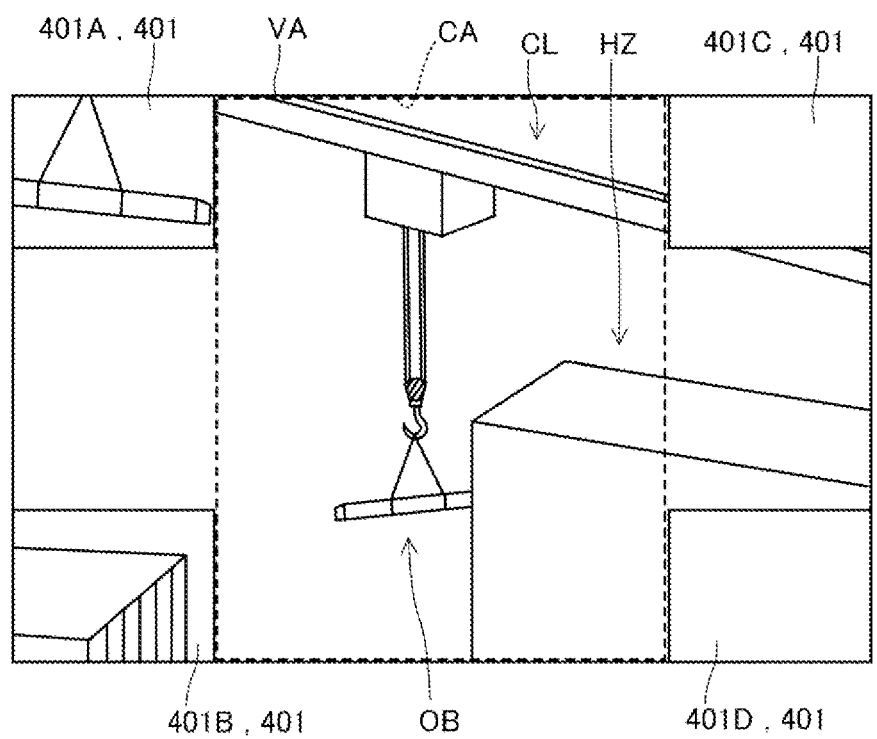
FIG. 8 is a diagram illustrating a display example of the HMD.
Figure 9:
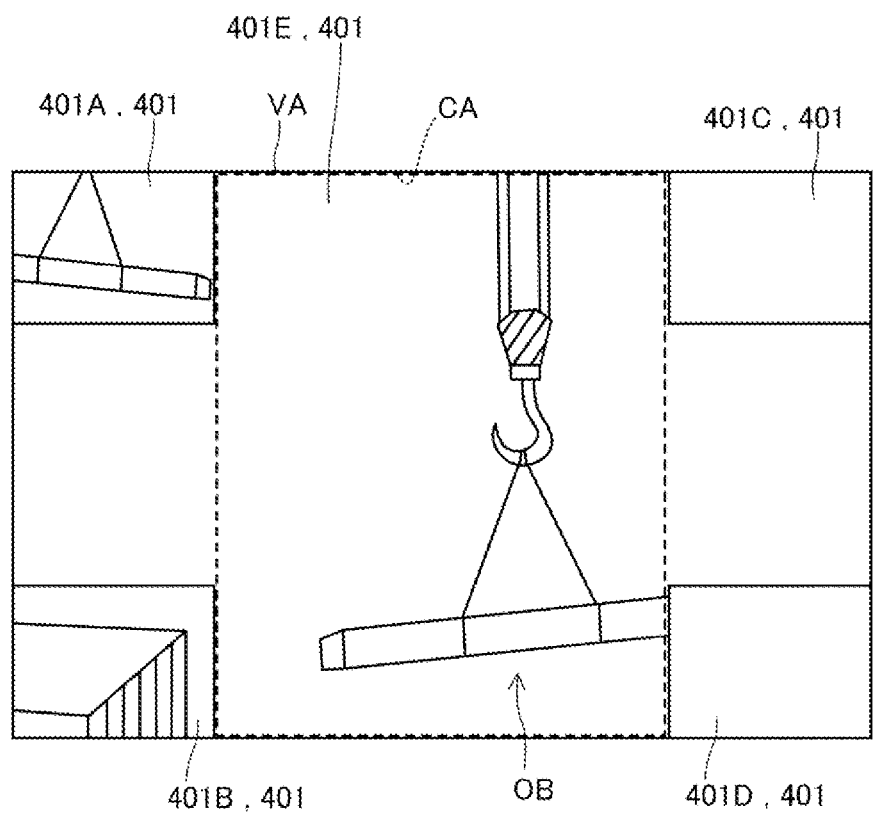
FIG. 9 is a diagram illustrating a display example of the HMD.

Each of FIG. 8 and FIG. 9 is a diagram illustrating a display example of the HMD 100. In FIG. 8 and FIG. 9, the reference symbol VA indicates a visual field of the user U in a state in which the user U wears the display unit 20. As described above, the display unit 20 includes the right-eye display unit 151 that causes the right eye RE of the user U to visually recognize an image and the left-eye display unit 152 that causes the left eye LE to visually recognize an image, and the right-eye display unit 151 and the left-eye display unit 152 independently display images. The image displayed on the right-eye display unit 151 and the image displayed on the left-eye display unit 152 may be the same, or may be images different from each other. For example, the display control unit 123 provides a parallax to the image displayed on the right-eye display unit 151 and the image displayed on the left-eye display unit 152, and thus can cause the user U to visually recognize a stereoscopic image.

Therefore, the display examples of FIG. 8 and FIG. 9 are not necessarily the same as the images displayed on the right-eye display unit 151 and the left-eye display unit 152. The display examples of FIG. 8 and FIG. 9 are merely examples schematically illustrating states that the user U visually recognizes.

FIG. 8 illustrates a display example in which the user U can directly view a target object OB. In the visual field VA, a region in a predetermined size that includes a center of the visual field VA of the user U is protected as a center region CA. In the center region CA, the image captured by the imaging device 201 is not displayed. With this, the range in which the user U directly views the target object OB is secured.

In the periphery of the center region CA, a camera image region 401 for displaying the image captured by the imaging device 201 is arranged. In the example of FIG. 8, four camera image regions 401A, 401B, 401C, and 401D are arranged. An image captured by one imaging device 201 is displayed in each of the camera image regions 401. At least two camera image regions 401 are arranged in the visual field VA. With this, in the visual field VA, there are displayed an image obtained by capturing a range including a first part of the target object OB and an image obtained by capturing a range including a second part of the target object OB, the second part being different from the first part. In the display mode of FIG. 8, the camera image regions 401 are arranged avoiding the center region CA.

When the user U can directly view the target object OB, the image displayed in the camera image region 401 may be an image having a transparency degree equal to or higher than 0%. In this case, advantageously, the user U can directly view the real space even at the position overlapping with the camera image region 401, and the user U is less likely to have an impression of a narrowed visual range.

FIG. 8 illustrates an example in which the user U directly views a suspended load during crane work. In this example, when the target object OB is moved by operating a crane, the target object OB hides behind an obstacle object HZ in some cases. In this case, the user U cannot directly view the target object OB. When the user U cannot directly view the target object OB, display of the HMD 100 is switched to the state of FIG. 9, for example.

FIG. 9 illustrates a display example in which the user U can directly view the target object OB. In the visual field VA, a camera image region 401E for displaying an image captured by the main camera is arranged in the center region CA. The image in the camera image region 401E may be an image having a transparency degree equal to or higher than 0%. In this case, advantageously, the user U can directly view the real space even at the position overlapping with the camera image region 401, and the user U is less likely to have an impression of a narrowed visual range. At least one camera image region 401 is arranged in the periphery of the camera image region 401E, and an image captured by the imaging device 201 other than the main camera is displayed therein. Further, the image displayed in the camera image region 401E and the image displayed in the periphery of the camera image region 401E are images obtained by capturing imaging ranges including different parts of the target object OB. Even in a state in which the target object OB cannot be directly viewed, the user U can view the target object OB in a plurality of directions.

The size and the position of the center region CA and the sizes, the number, and the positions of the camera image regions 401 in FIG. 8 and FIG. 9 are determined in the display setting data selected in Step S15. The memory 330 may store three or more pieces of the display setting data 334. In this case, the display setting data may be selected by an operation from the user U.

1-6. Operations and Effects of First Exemplary Embodiment

As described above, the information processing system 1 according to the exemplary embodiment of the present disclosure includes the HMD 100 including the display unit 20 of a transmissive type that the user U wears on their head and the line-of-sight detection device 153 that detects motion of the eye of the user U. The information processing system 1 includes the management server 300 including the identification unit 323 and the image management unit 324. The identification unit 323 identifies, based on motion of the eye of the user U, the target object in the real space at which the user U gazes through the display unit 20. The image management unit 324 causes the first imaging device of the imaging devices 201 to capture an image of the first imaging range including the first part of the target object, the first imaging device being at the position from which an image of the first part is capturable. The HMD 100 causes the display unit 20 to display the first captured image obtained by the first imaging device.

With this configuration, the target object at which the user U gazes can be identified based on the line-of-sight direction of the user U, and the imaging device 201 can capture an image of the target object. Thus, when the user U gazes at the target object, the captured image obtained by capturing the target object is displayed on the display unit 20. Thus, operability can be improved.

In the information processing system 1, the image management unit 324 causes the second imaging device of the imaging devices 201 to capture an image of the second imaging range including the second part of the target object, the second imaging device being at the position from which an image of the second part different from the first part is capturable. The HMD 100 causes the display unit 20 to display the second captured image obtained by the second imaging device. With this configuration, the plurality of captured images obtained by capturing different parts of the target object are displayed on the display unit 20. Thus, the display unit 20 allows the user U to visually recognize the plurality of images obtained by capturing the target object at which the user U gazes.

In the information processing system 1, the image management unit 324 acquires the first distance from the first imaging device to the target object and the second distance from the second imaging device to the target object, and select any one of the first imaging device and the second imaging device by comparing the first distance and the second distance with each other. The HMD 100 causes the display unit 20 to display the captured image that is obtained by the imaging device 201 selected by the image management unit 324. With this configuration, the imaging device 201 at the position suitable for capturing an image of the target object is selected, and the image captured by the selected imaging device 201 is displayed on the display unit 20. With this, through use of the imaging devices 201, the user U can visually recognize the target object in a satisfactory manner.

In the information processing system 1, the image management unit 324 controls the first imaging device to change the focal distance, based on the distance from the first imaging device to the target object. With this configuration, the focal distance of the imaging device 201 is adjusted in accordance with the target object, and hence the captured image with high quality can be displayed on the display unit 20.

In the information processing system 1, the line-of-sight detection device 153 detects motion of the right eye RE and motion of the left eye LE of the user U, and the identification unit 323 identifies the gazing point of the user U, based on the motion of the right eye RE and the motion of the left eye LE. The line-of-sight detection device 153 identifies an object in the real space at a position overlapping with the gazing point for the predetermined time period as the target object. With this configuration, based on the motion of the right eye RE and the motion of the left eye LE of the user U, the target object at which the user U gazes can be securely identified. Thus, when the user U gazes at the target object with both their eyes, the captured image obtained by capturing the target object is displayed on the display unit 20.

In the information processing system 1, the image management unit 324 controls the first imaging device to change the first imaging range in accordance with motion of the target object. With this, even when the target object moves, the captured image obtained by capturing the target object can be displayed on the display unit 20.

In the information processing system 1, the management server 300 includes the image management unit 324. The image management unit 324 determines, based on the positional relationship between the HMD 100 and the target object, whether the user U can visually recognize the target object through the display unit 20, and switches the display modes of the display unit 20, based on the determination result. With this, when the user U cannot visually recognize the target object in a direct manner, the display modes of the display unit 20 can be switched. Thus, the user U is not required to determine whether the target object is visually recognizable and operate the display unit 20, and still the display modes are switched as appropriate. Thus, convenience can further be improved.

In the information processing system 1, the display unit 20 displays the first captured image avoiding a position, on the display unit 20, through which the user U visually recognizes the target object. Thus, the image obtained by capturing the target object by the imaging device 201 can be displayed without preventing the user U to visually recognize the target object in a direct manner.

The HMD 100 includes the display unit 20 of a transmissive type that the user U wears on their head and the line-of-sight detection device 153 that detects motion of the eye of the user U. The HMD 100 includes the display control unit 123. The display control unit 123 causes the display unit 20 to display the first captured image. In other words, the target object in the real space at which the user U gazes through the display unit 20 is identified based on the motion of the eye of the user U detected by the line-of-sight detection device 153, and the first captured image obtained by capturing the first imaging range including the first part of the target object is acquired. In this case, the first captured image is displayed. With this configuration, the target object at which the user U gazes is identified based on the line-of-sight direction of the user U, and the image obtained by capturing the target object by the imaging devices 201 is displayed on the display unit 20. Therefore, the user U can visually recognize the target object by gazing at the target object through use of the imaging device 201. Thus, operability can be improved.

The control program 131 is a program that can be executed by the processor 121. The processor 121 controls the HMD 100 including the display unit 20 of a transmissive type that the user U wears on their head. The control program 131 causes the processor 121 to function as the display control unit 123. The target object in the real space at which the user U gazes through the display unit 20 is identified based on the motion of the eye of the user U, and the first captured image obtained by capturing the first imaging range including the first part of the target object is acquired. In this case, the display control unit 123 causes the display unit 20 to display the first captured image. When the processor executes the program, the target object at which the user U gazes is identified based on the line-of-sight direction of the user U, and the image obtained by capturing the target object by the imaging devices 201 is displayed on the display unit 20. Therefore, the user U can visually recognize the target object by gazing at the target object through use of the imaging device 201. Thus, operability can be improved.

2. Second Exemplary Embodiment

Figure 10:
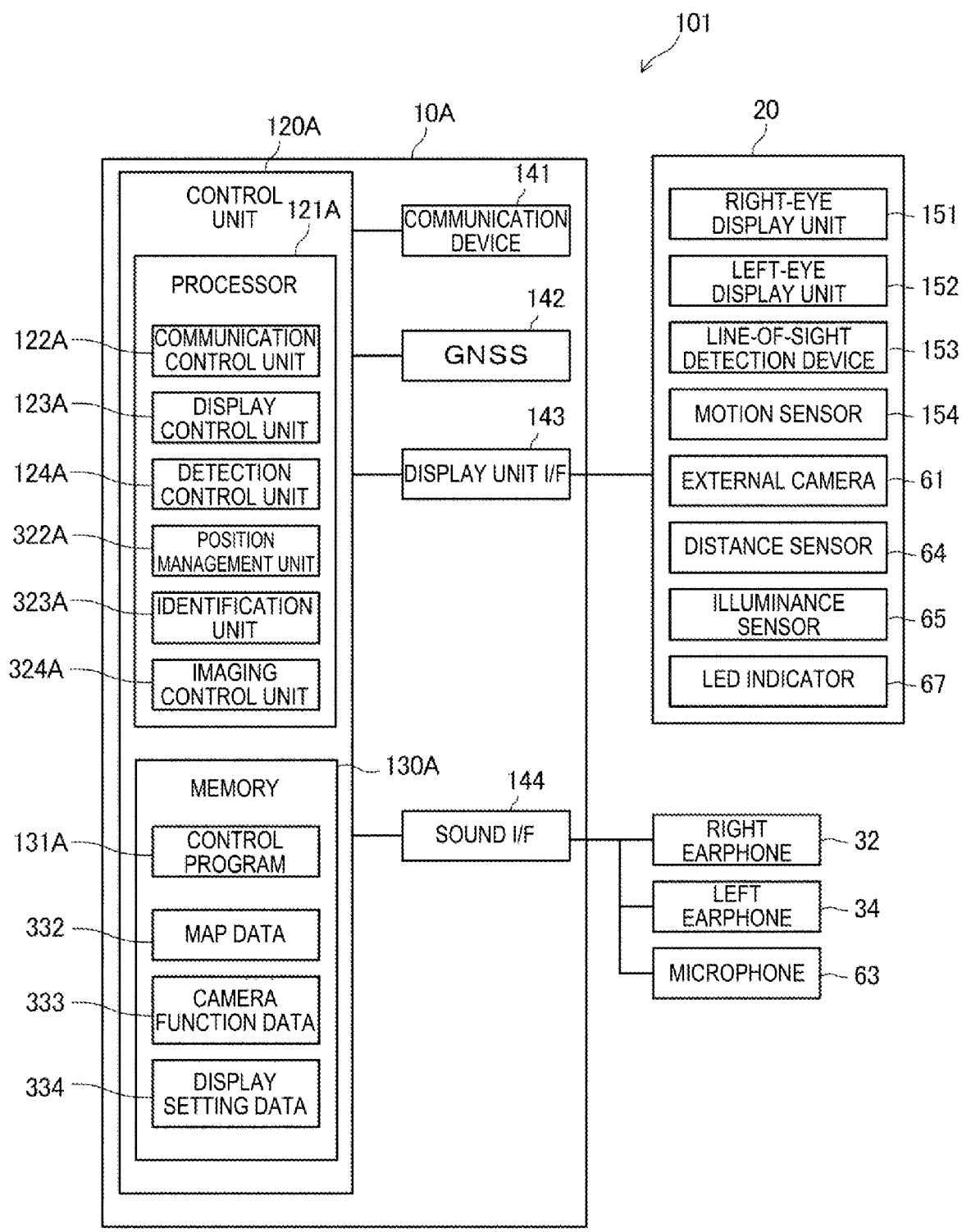
FIG. 10 is a block diagram of an HMD according to a second exemplary embodiment.

FIG. 10 is a block diagram of an HMD 101 according to a second exemplary embodiment. The information processing system 1 according to the second exemplary embodiment does not include the management server 300. In the information processing system 1 according to the second exemplary embodiment, the configuration of the imaging unit 200 is commonly shared with the first exemplary embodiment.

The HMD 101 illustrated in FIG. 10 is obtained by changing the control unit 120 included in the HMD 100 to a control unit 120A. The components of the HMD 101 that are commonly shared with the HMD 100 are denoted by identical reference symbols, and description therefor is omitted.

The control unit 120A includes a processor 121A and a memory 130A. The hardware configuration of the processor 121A is commonly shared with the processor 121. Further, the hardware configuration of the memory 130A is commonly shared with the memory 130.

The memory 130A stores a control program 131A to be executed by the processor 121A. Furthermore, the memory 130A stores the map data 332, the camera function data 333, and the display setting data 334. Those pieces of data are the data stored in the management server 300 of the first exemplary embodiment.

The processor 121A executes the control program 131A, and thus functions as a communication control unit 122A, a display control unit 123A, and a detection control unit 124A. Further, the processor 121A functions as a position management unit 322A, an identification unit 323A, and an image management unit 324A.

The position management unit 322A executes functions similar to those executed by the position management unit 322 of the management server 300 of the first exemplary embodiment. The identification unit 323A functions similarly to the identification unit 323 of the management server 300, and the image management unit 324A functions similarly to the image management unit 324. The communication control unit 122A functions similarly to the communication control unit 122. Furthermore, the communication control unit 122A executes communication with the imaging device 201 via the communication device 141 during the operations of the position management unit 322A, the identification unit 323A, and the image management unit 324A.

The HMD 101 illustrated in FIG. 10 executes the operations illustrated in FIG. 5, FIG. 6, and FIG. 7 so as to display the images, which are obtained by the imaging devices 201, on the HMD 100. In other words, the HMD 101 functions as a display device and an information processing device. The information processing system 1 including the HMD 101 functions similarly to the first exemplary embodiment, and exerts similar effects.

3. Other Exemplary Embodiments

The present disclosure is not limited to the configurations in the exemplary embodiments described above, and can be implemented in various aspects without departing from the gist of the disclosure.

The specific processing executed by the detection control unit 124 for detecting the line-of-sight direction, identifying the gazing point, and generating the posture information may be changed as appropriate. For example, the detection control unit 124 may use a magnetic sensor or the like included in the motion sensor 154 to detect the line-of-sight direction or generate the posture information.

The various processing executed by the HMD 100 may be executed through use of an external computer in place of the controller 10. In other words, each of the functional units included in the processor 121 illustrated in FIG. 3 may be provided in a computer coupled to the display unit 20, and various numbers and information stored in the memory 130 may be stored in the computer coupled to the display unit 20. In this case, the HMD 100 may transmit data detected by various sensors included in the display unit 20 and various sensors included in the controller 10 to the computer, and may execute the processing, based on the data input from the computer. As the computer of this type, for example, a smartphone or a tablet personal computer may be adopted.

Although the configuration in which the controller 10 is coupled to the display unit 20 by wire is illustrated in the exemplary embodiments described above, the present disclosure is not limited thereto, and the display unit 20 may be coupled wirelessly to the controller 10. Further, the controller 10 may be implemented by a plurality of devices. Further, a wearable device attachable to the body or clothes of the user, or to the personal adornments worn by the user may be used instead of the controller 10. The wearable device in such a case may be, for example, a watch-like device, a pen-like device, or the like.

In addition, the configuration in which the display unit 20 is separated from the controller 10 but they are coupled via the coupling cable 40 is illustrated as an example in the exemplary embodiments described above. The disclosure is not limited thereto, and the controller 10 and the display unit 20 may be integrated and worn on a head of a user.

In addition, the display unit 20 is not limited to being mounted directly on the head of the user U. For example, there may be adopted a configuration in which the user U wears a helmet or a cap on their head and the display unit 20 is mounted to the helmet or the cap.

Various configurations may be adopted as the configuration of the optical system of the display unit 20 as long as the image light is caused to enter the eyes of the user by the right light-guiding plate 26 and the left light-guiding plate 28. In addition, a diffraction grating, a prism, or a holographic display unit may be used as the right light-guiding plate 26 and the left light-guiding plate 28. The configurations of the right-eye display unit 151 and the left-eye display unit 152 are not limited to an organic EL display device or a liquid crystal display device. Instead, a digital micro-mirror device may be used, or a configuration to which a Liquid Crystal on Silicon (LCOS) technique is applied may be used. Further, the right-eye display unit 151 and the left-eye display unit 152 may be configured using a self-emitting-type display element represented by an LED array, a laser array, a quantum dot light emitting device, or the like. Further, the right-eye display unit 151 and the left-eye display unit 152 may be, for example, a laser scanning type in which a laser light source and a laser scanner are combined.

At least some of the functional blocks illustrated in FIG. 3, FIG. 4, and the like may be realized by hardware and by cooperation of hardware and software, and the present disclosure is not limited to a configuration in which independent hardware resources are arranged as illustrated in the figures.

Further, the processing of the flowcharts illustrated in FIG. 5, FIG. 6, and FIG. 7 is divided into units according to the main content of the processing to make the processing by the control unit 120 easier to understand. The exemplary embodiments are not limited by the way of dividing the processing units of each flowchart or the names thereof. Further, the processing order of the above-described flowchart is also not limited to the illustrated example.

Further, the control program 131 to be executed by the processor 121 may be stored in an external apparatus or device, and may be acquired via the communication device 141 or the like. Further, the programs can also be recorded in a computer-readable recording medium. The recording medium may be a magnetic or optical recording medium, or a semiconductor memory device. Specifically, a flexible disk, various optical disks, a magneto-optical disk, a flash memory, a card-type recording medium, or a fixed-type recording medium is exemplified. In addition, the recording medium may be a non-volatile storage device such as a RAM, a ROM, or an HDD that is an internal storage device included in an image display device. The control program 331 to be executed by the processor 320 is similarly configured.

What is claimed is:

1. An information processing system comprising:
a display device including:
a display unit of a transmissive type configured to be worn on a head of a user and
a detection unit configured to detect motion of an eye of the user; and
an information processing device including:
a communication unit configured to communicate with a first imaging device, a second imaging device and the display device via a communication network,
an identification unit configured to identify, based on the motion of the eye of the user, a target object in a real space at which the user gazes through the display unit, and
an imaging control unit configured to select the first imaging device as a main camera, a position of the target object captured by the first imaging device being nearer to a center of an angle of view of the first imaging device than a position of the target object captured by the second imaging device is to a center of an angle of view of the second imaging device, wherein
the imaging control unit causes the first imaging device to capture an image of a first imaging range including a first part of the target object, the first imaging device being at a position different from the display device and from which an image of the first part is capturable,
the display device causes the display unit to display a first captured image captured by the first imaging device from a different direction from the user upon receiving the first captured image transmitted from the information processing device through the communication network, and
the imaging control unit controls the first imaging device to change a focal distance based on a distance from the first imaging device to the target object.

2. The information processing system according to claim 1, wherein
the imaging control unit causes the second imaging device to capture an image of a second imaging range including a second part different from the first part of the target object, the second imaging device being at a position different from the display device and from which an image of the second part is capturable, and
the display device causes the display unit to display a second captured image captured by the second imaging device from a different direction from the user upon receiving the second captured image transmitted from the information processing device through the communication network.

3. The information processing system according to claim 1, wherein
the detection unit detects motion of a right eye and motion of a left eye of the user and
the identification unit identifies a gazing point of the user based on the motion of the right eye and the motion of the left eye, and identifies an object in the real space as the target object, the object being at a position overlapping with the gazing point for a predetermined time period or longer.

4. The information processing system according to claim 1, wherein
the imaging control unit controls the first imaging device to change the first imaging range in accordance with motion of the target object.

5. The information processing system according to claim 1, wherein
the information processing device includes an image control unit configured to determine, based on positional relationship between the display device and the target object, whether the target object is visually recognizable by the user through the display unit and switch display modes of the display unit based on a determination result.

6. The information processing system according to claim 1, wherein
the display unit displays the first captured image avoiding a position, on the display unit, through which the user visually recognizes the target object.

7. A display device, comprising:
a display unit of a transmissive type configured to be worn on a head of a user;
a detection unit configured to detect motion of an eye of the user;
an imaging control unit configured to control a first imaging device and a second imaging device, each the first imaging device and the second imaging device being configured to capture an image of a target object in a real space, and a position of the target object in the image captured by the first imaging device being nearer to a center of an angle of view of the first imaging device than a position of the target object in the image captured by the second imaging device is to a center of an angle of view of the second imaging device; and
a display control unit configured to display a first captured image, received through a communication network, on the display unit when the target object in the real space at which the user gazes through the display unit is identified based on the motion of the eye of the user detected by the detection unit and the first captured image obtained by capturing a first imaging range including a first part of the target object is acquired, wherein the first captured image is the image captured by the first imaging device from a different position and a different direction from the user, and
wherein the imaging control unit is configured to control the first imaging device to change a focal distance based on a distance from the first imaging device to the target object.

8. A non-transitory computer-readable storage medium storing a program executable by a computer and configured to control a display device including a display unit of a transmissive type configured to be worn on a head of a user and to control a first imaging device and a second imaging device, each of the first imaging device and the second imaging device being configured to capture an image of a target object in a real space, and a position of the target object in the image captured by the first imaging device being nearer to a center of an angle of view of the first imaging device than a position of the target object in the image captured by the second imaging device is to a center of an angle of view of the second imaging device, the program being configured to cause the computer to function as
a display control unit configured to display a first captured image, received through a communication network, on the display unit when the target object in the real space at which the user gazes through the display unit is identified based on motion of an eye of the user and the first captured image obtained by capturing a first imaging range including a first part of the target object is acquired, wherein the first captured image is the image captured by the first imaging device from a different position and a different direction from the user, and
wherein the imaging control unit is configured to control the first imaging device to change a focal distance based on a distance from the first imaging device to the target object.

* * * * *